United States Patent [19]

Alessandri, Jr.

[11] Patent Number: 5,001,322

[45] Date of Patent: Mar. 19, 1991

[54] MANUAL PERCUSSIVE WELDING APPARATUS

[75] Inventor: Louis A. Alessandri, Jr., Rehoboth, Mass.

[73] Assignee: Triad, Inc., Chartley, Mass.

[21] Appl. No.: 548,316

[22] Filed: Jul. 2, 1990

[51] Int. Cl.⁵ .............................................. B23K 9/22
[52] U.S. Cl. ..................................................... 219/95
[58] Field of Search ....................... 219/95, 96, 98, 99

[56] References Cited

U.S. PATENT DOCUMENTS

| | | |
|---|---|---|
| 2,419,749 | 4/1947 | Weinhardt et al. ................... 219/95 |
| 2,843,724 | 7/1958 | DeGaeta et al. ....................... 219/96 |
| 3,138,693 | 6/1964 | Buehler et al. ........................ 219/95 |
| 4,752,666 | 6/1988 | Alessandri, Jr. ...................... 219/95 |

Primary Examiner—Clifford C. Shaw
Attorney, Agent, or Firm—Barlow & Barlow, Ltd.

[57] ABSTRACT

A manual percussive welding apparatus which has a fixed electrode and a movable electrode is provided with a means in the form of a stop that comes into contact with the moveable electrode assembly to prevent further downward movement of the movable electrode. The movable electrode is normally spring-loaded to be urged toward the fixed electrode and is held in cocked position by a latching means.

4 Claims, 1 Drawing Sheet

MANUAL PERCUSSIVE WELDING APPARATUS

BACKGROUND OF THE INVENTION

In my prior patent, U.S. Pat. No. 4,752,666, I disclosed a manual percussive welding apparatus of the type commonly known as a fusion welder which utilized a spring-loaded electrode that could be manually released to engage a fixed electrode and discharge a charged capacitor. This type of welding is particularly useful in the jewelry industry or in the electronics industry where small objects are required to be welded and where it is desirable to minimize flash. For example, one of the more common welding procedures is to weld an earring post to the main body of the earring by the utilization of a hollow chuck that would hold the stud. One of the difficulties that has been noted in use of the apparatus as disclosed in my prior patent has been in attempting to adjust the distances between the fixed electrode and the movable electrode to accept various types of parts. The instant invention overcomes this problem and provides an improved operation of the welding apparatus of my previous patent.

SUMMARY OF THE INVENTION

The welding apparatus of the present invention comprises two principal sections, namely an upper section which has a spring loaded movable upper electrode that is normally locked into position and which may be readily released by pulling a knob to allow the electrode to move rapidly toward a fixed electrode or anvil. The movable upper electrode is arranged to generally hold a stud which is desired to be welded to a work piece by utilizing an appropriate collet or chuck. To adjust the stud relative to the work piece and to prevent impingement of possibly the entire upper electrode against the work piece, a sleeve surrounds the second electrode which is retained in a housing and this sleeve is adjustable relative to the housing so that the upper end thereof may engage a collar or other stop means fixedly secured to the upper electrode. The welding process is achieved by the electric arc that is produced which vaporizes the tip of the stud and heats the appropriate areas of the work piece to form a weld.

DESCRIPTION OF THE PREFERRED EMBODIMENT

Figures 1, 2:
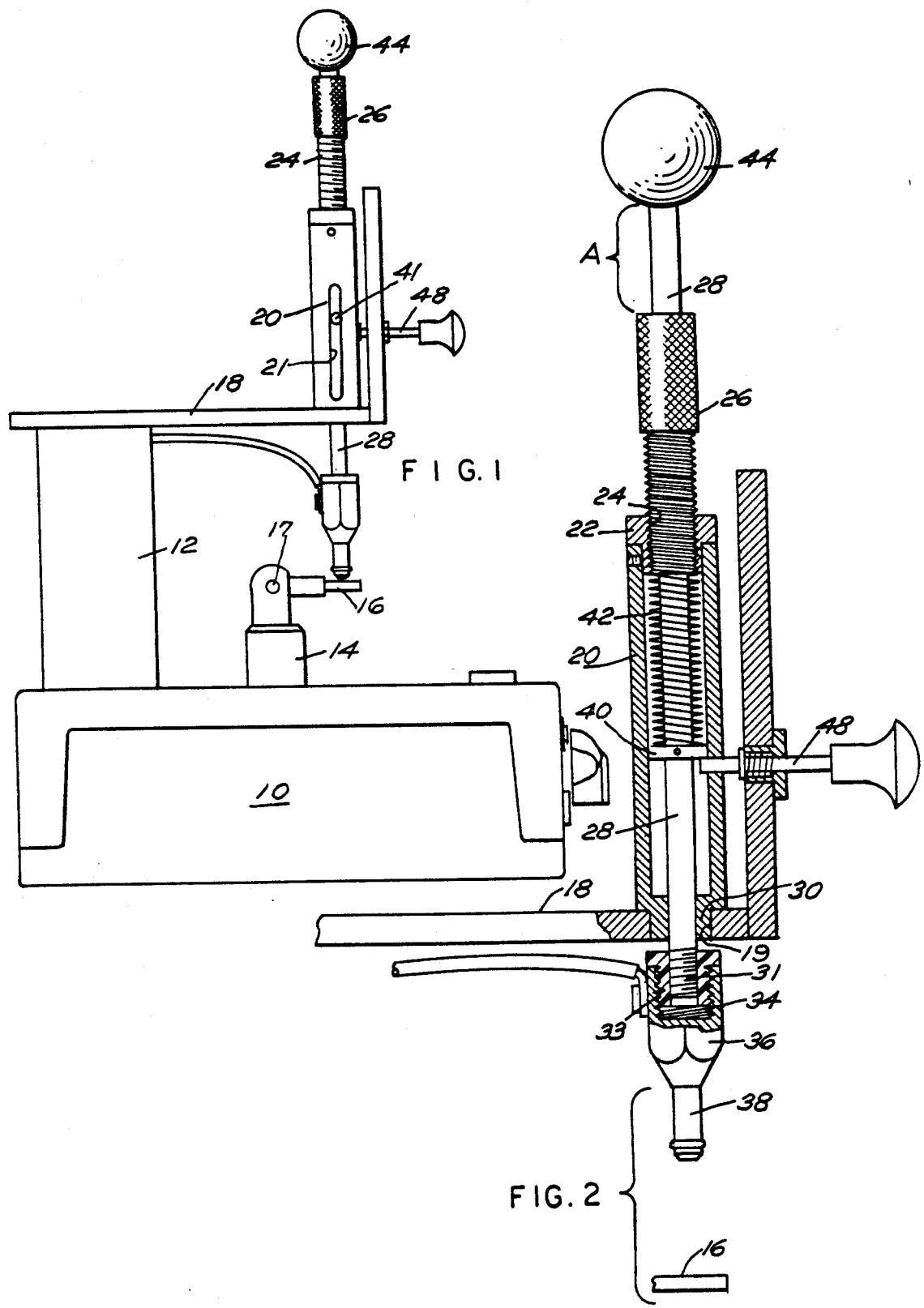
FIG. 1 is a side elevational view of the welding apparatus made in accordance with the invention.
FIG. 2 is an enlarged partial sectional view illustrating the spring-loaded movable upper electrode and the apparatus associated therewith.

A complete welding apparatus of the same general type as shown in FIG. 1 of the drawings but with different inventive features is shown in my previous patent referenced above and will not be repeated but may be incorporated herein by reference. Referring to FIG. 1, the apparatus consists of a base 10 which houses the electrical components, which base supports a rather substantial vertical post 12 and has a mounting post 14 that forms the support for the lower anvil 16 that is received in an aperture in the post 14 and may be suitably secured therein by locking means received in a threaded bore 17 as, for example, a clamp screw as seen in my previous patent.

A substantial support plate 18 extends from the post 12 and serves as a support for the entire upper electrode assembly.

The upper moveable electrode means includes a housing 20, one end of which is supported on the plate 18 and as seen in FIG. 2, is essentially received in a bore 19 thereof. The housing has a upper cap 22 that has a threaded bore 24 and into this bore there is threadingly received a collar 26 having an upper end stop surface. The collar 26 has an internal bore into which is slideably received a cylindrical post or rod 28.

The rod 28 is guided for movement therefor within the sleeve 26 and passes out through a bore 30 in the end of the housing 20 and onto the end thereof, which is threaded as at 31 to receive an insulated bushing 33, that in turn is received in a threaded bore 34 of the upper electrode tip 36. The upper electrode tip is provided with a collet 38 for the reception of studs. Intermediate the post 28, there is fixedly secured a stop ring 40 and between the stop ring 40 and the lower end of the adjustable sleeve 26 is a compression spring 42. As seen in FIG. 1, the housing has a slot 21 and through this slot there protrudes a dowel 41 that is secured to the ring 40. The upper end of the rod 28 is provided with a stop means 44 that also serves as a handle to withdraw the rod 28 while a release means in the form of a spring-loaded plunger 48 acts as a latch against the ring 40.

In operation, the stud that will be retained by the collet 38 is adjusted relative to the work piece, on the anvil 16 and the adjustable collar 26 is then also adjusted so that the end surface engages the upper stop 44 or handle. This adjusts the amount of travel of the upper electrode assembly which would be limited to the travel as represented by the distance A as seen in FIG. 2. Also rotation of the rod 28 is prevented by the dowel 41 riding in slot 21. Thus, when the latch 48 releases the upper electrode assembly, it moves under urgence of the spring 42 until the stud held in the collet 38 engages the work piece held in the anvil 16, at which time current will flow between stud and the work piece vaporizing the tip end of the stud to produce an electric arc between the stud and the work piece. It is well known to those skilled in the art that the arc melts opposing portions of the shank end of the stud and of the surface of the work piece so that when the stud and the work piece are driven together by the force of impact, the melted portions contact each other and fuse together to form the weld. As will be seen, any further downward movement of the upper electrode assembly is prevented by the engagement of the upper surface of the sleeve with the stop means 44 on the upper end of the post 28.

I claim:

1. In apparatus for fusion welding having a first electrode consisting of a fixed member for mounting a workpiece, an elongated hollow housing having a second moveable electrode means mounted in said housing for reciprocation therein and spring means in the housing normally urging the second electrode means toward the first electrode, locking means normally holding the second electrode away from the first electrode, the improvement comprising an elongated sleeve surrounding the second electrode means, said sleeve adjustably secured to the housing and having an end surface, a stop means on said second electrode means normally located spaced from the end surface of the sleeve whereby the second electrode means will travel by urgence of the spring toward the first electrode a distance until the stop mean engages the end surface of the sleeve.

2. In an apparatus as in claim 1 wherein the upper end of the housing has an internally threaded cap and the sleeve is externally threaded and received in said threaded cap for adjustment relative thereto within the housing.

3. In the apparatus as in claim 1 wherein the housing has a guidance slot and a dowel means extends from the second electrode means into the guidance slot to prevent rotation of the second electrode means.

4. A method of welding a stud to a workpiece comprising the steps of providing a moveable electrode having a stop means at one end and a collet at the other end, retaining the stud within a collet, moving the stud and electrode from an upper position downwardly towards a lower position so that the workpiece is engaged, providing an elongated sleeve about the electrode, adjusting the sleeve to engage the stop means and hold the stud in loose abutment with the work piece, moving the stud to an upper position, providing a force to move the electrode and stud rapidly toward the workpiece, arresting the downward movement of the stud by engagement of the stop means and sleeve to the pre-selected position and supplying welding current through the stud and the workpiece to effect a weld.

* * * * *